3,179,982
COTTON CLEANING MACHINE
Orville Mitchell, Dallas, Tex., assignor to John E. Mitchell Company, Dallas, Tex., a corporation of Missouri
Filed May 24, 1962, Ser. No. 197,442
10 Claims. (Cl. 19—203)

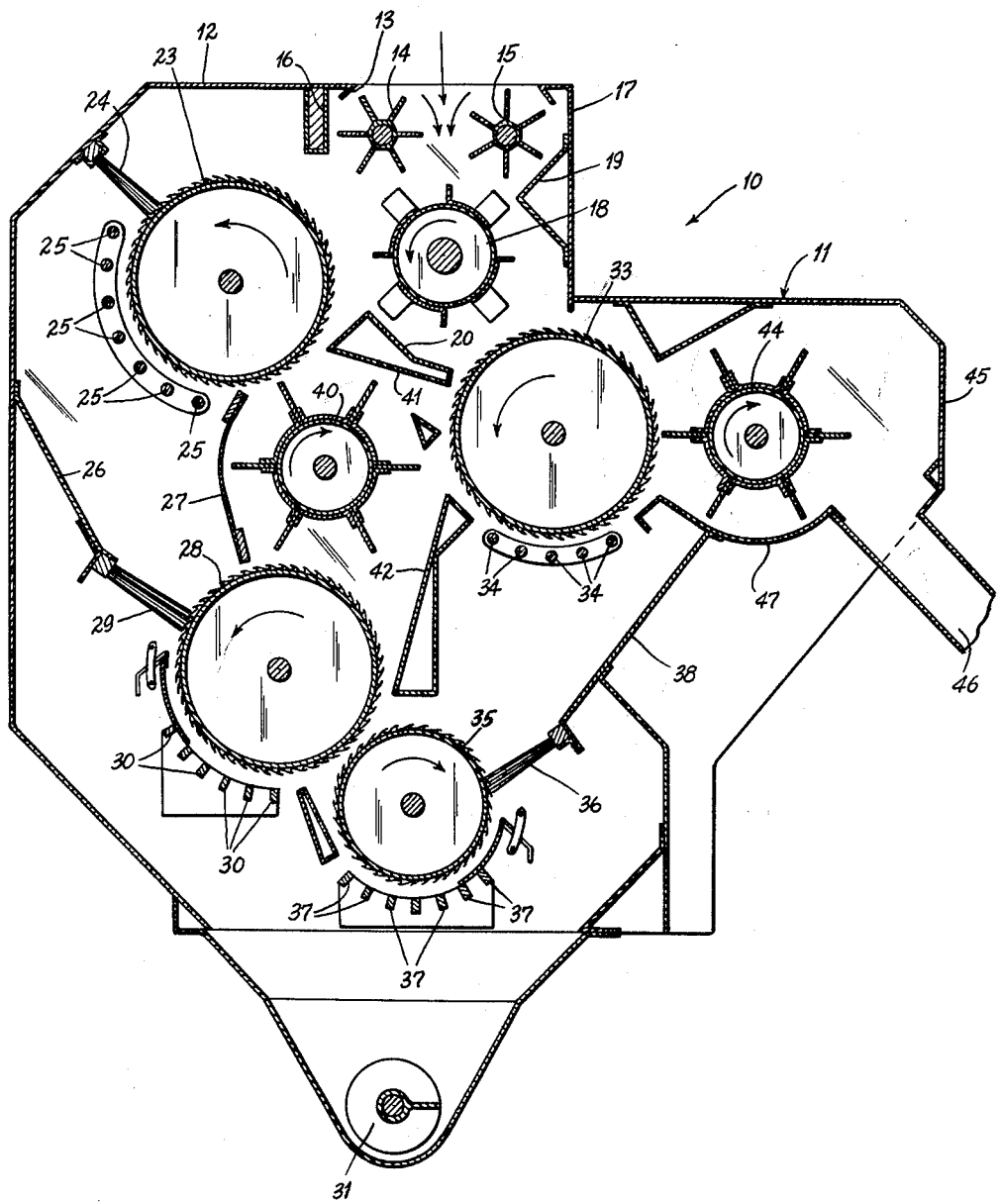

This invention relates to a cotton cleaning machine and especially to a cleaning machine for dividing the cotton and trash introduced into the machine into two paths for separate cleaning operations while keeping the streams of cleaned cotton and trash separate for maximum efficiency of operation.

The cleaning machine uses a distributor roller for separating the cotton and trash into two streams, and preferably one of the streams comprises substantially more than half the trash and substantially less than half the cotton introduced into the machine. This one stream, which contains relatively trashy cotton, is subjected to a cleaning operation and then the cotton is joined with the relatively cleaner cotton of the other stream and is subjected to another cleaning operation. Thus, the cleaning saws for the two streams are separated, and there are means in the housing for keeping the trash dropped from the cleaning saws in spaced-apart, separate paths. These paths of trash terminate near the lower end of the housing at reclaimer saw cylinders which intercept the cotton dropped with the trash. One of the reclaimer saw cylinders doffs cotton from the other reclaimer saw cylinder, and there is a doffer for doffing cotton from the doffing reclaimer saw cylinder, the latter doffer is positioned between between the paths of trash so that the doffer cotton does not co-mingle with the trash.

The principal object of this invention is to provide a cotton cleaning machine wherein the cotton and trash are divided into two streams with one of the streams being dirtier cotton than the other stream, wherein the machine has means to maintain separation between the cleaned cotton and the paths of flow of trash through the machine.

The drawing is a side elevation view in typical front to rear section through the cotton cleaning machine.

In this cotton cleaning machine 10, there is a housing 11 of no particular configuration or shape except that certain walls may provide baffles or barriers for cotton or trash or hulls or may be positioned in certain places to support barriers or operating parts. Such walls will be described in conjunction with the description of other parts of the machine which make the walls significant.

The housing 11 has a top wall 12 through which there is an opening 13 permitting the introduction into the housing of field cotton along with sticks, stems, trash and earth. As usual, there are a pair of feeder rollers 14 and 15 immediately below the inlet opening 13. The feeder rollers 14 and 15 rotate slowly in opposite directions, as indicated by the arrows, to feed the cotton and trash downwardly between them. A baffle 16 extends downwardly from the top wall 12 adjacent the left side of the feeder roller 14, and a side wall 17 of the housing 11 extends downwardly adjacent the right side of the feeder roller 15 to confine the entry area of cotton and trash.

Below the feeder rollers 14 and 15 there is a bladed distributor roller 18 that rotates in a counterclockwise direction at speeds of about 600 r.p.m. or more. Substantially all of the cotton sticks, stems, hulls, trash and earth introduced into the housing 11 are directed toward the distributor roller 18 by the feeder rollers 14 and 15. An inclined baffle wall 19 supported on the side wall 17 of the housing 11 aids in directing this material toward the distributor roller 18.

The function and operation of the distributor roller 18 is as described in the co-pending application for United States Letters Patent Serial No. 182,453, filed March 26, 1962, in the name of Harry C. Word and assigned to the same assignee as the present invention. In the Word application, as fully described in that co-pending application, the fast moving blades at the upper side of the distributor roller 18 propel larger amounts of the heavy trash, including sticks, stems, hulls and earth in the direction toward which the blades are moving (to the left in the view illustrated in the drawing). These same upper blades also throw a good portion of the cotton to the left. However, the major portion of cotton, and what remains of the trash, are carried by the blades of the distributor roller 18 as it rotates until such blades are on the lower side of the distributor roller 18 from which position the cotton and trash are thrown or fall downwardly and to the right of the distributor roller. A baffle wall 20 beneath the distributor roller 18 confines the cotton and trash within the influence of the blades to assure discharge of such cotton and trash with a component of direction to the right of the distributor roller.

To the left of the distributor roller 18 is a cleaning saw cylinder 23. The cleaning saw cylinder 23 rotates in a counterclockwise direction at about 300 r.p.m. past a brush 24 and then past a plurality of beater bars 25. The brush 24 presses the cotton onto the teeth of the saw cylinder 23 while permitting sticks, stems, hulls and trash to drop downwardly, and the beater bars 25 separate the sticks, stems, hulls and trash from the cotton.

The sticks, stems, hulls and trash drop downwardly and are guided by a hull board 26 and a baffle wall 27 toward a reclaimer saw cylinder 28. The reclaimer saw cylinder 28 rotates in a counterclockwise direction at about 200 r.p.m. past a brush 29 and a plurality of grid bars 30 which allow and cause the sticks, stems, hulls, trash and earth to pass downwardly toward a screw conveyor 31 at the lower end of the housing. More will be said about the reclaimer saw cylinder hereinafter.

Below and to the right of the distributor roller 18, there is another cleaning saw cylinder 33 that rotates in a counterclockwise direction at about 300 r.p.m. A plurality of beater bars 34 are spaced opposite the lower side of the cleaning saw cylinders 33 to discharge sticks, stems, hulls, trash and earth in a downward direction.

Somewhat below the cleaning saw cylinder 33, there is a reclaimer saw cylinder 35 which rotates in a clockwise direction at about 100 r.p.m. The reclaimer saw cylinder 35 is positioned adjacent to the reclaimer saw cylinder 28. The saw cylinder 35 also rotates past a brush 36 and a plurality of beater bars 37. There is an inclined hull board or wall 38 to direct sticks, stems, hulls, trash and earth, and cotton dropped therewith, from the cleaning saw cylinder 33 toward the reclaimer saw cylinder 35.

The reclaimer saw cylinder 28, which rotates in a direction opposite to that of the reclaimer saw cylinder 35, and at twice the speed, also operates as a doffer for the reclaimer saw cylinder 35. For this reason, the reclaimer saw cylinder 28 is somewhat larger than the reclaimer saw cylinder 35 to give it the capacity to handle both the cotton reclaimed by it and the cotton reclaimed by the saw cylinder 35.

Adjacent the lower side of the cleaning saw cylinder 23 and adjacent the upper side of the reclaimer saw cylinder 28, there is a single doffer wheel 40 which rotates in a clockwise direction at a speed much greater than that of either the cleaning saw cylinder 23 or the reclaiming saw cylinder 28 and doffs cotton from both these saw cylinders. The baffle wall 27 keeps the cotton confined between the blades of the doffer 40. Assisting the baffle wall 27 is a baffle wall 41 adjacent the upper side of the doffer wheel 40. The doffer wheel 40 slings the cotton toward the right against the teeth of the cleaning saw cylinder 33.

There is a baffle wall 42 below and to the right of the doffer wheel 40 to guide cotton dropped from the doffer wheel 40 toward the upper surface of the reclaimer saw cylinder 28 where it is carried a short distance and then picked up again by the doffer wheel 40. Hence this cotton, which is already cleaned, does not mix with the trash encountered elsewhere by the reclaimer saw cylinder 28. Loose trash, however, which may throw off of saw 33 and slide down wall 42, will not be impaled by teeth of saw 28 and, therefore, falls through the space between wall 42 and saw 28.

A doffer wheel 44, positioned adjacent the right side of the cleaning saw cylinder 33 rotates in a clockwise direction at a high rate of speed and doffs the cotton from the cleaning saw cylinder 33. This cotton is slung to the right against a vertical wall 45 on the housing, after which the cotton drops toward a cotton outlet 46, or else the cotton falls directly toward the outlet 46 from the doffer 44. An arcuate wall 47 is positioned below the doffer wheel 44. An occasional lock of cotton fails to discharge down the slide 46 and is confined by the wall 47 and carried around for discharge on the next revolution of the wheel 44.

*Operation*

In this cotton cleaning machine, all of the cotton, trash and earth introduced into the inlet 13 are directed by the feeder rollers 14 and 15 toward the upper side of the distributor roller 18. The fast rotating distributor roller 18 propels about ⅔ to ¾ of the trash and about ⅓ to ¼ of the cotton to the left toward the cleaning saw cylinder 23. The remaining ⅓ to ¼ of the trash and ⅔ to ¾ of the cotton are carried by the blades of the distributor roller 18 past the baffle wall 20 and discharged to the right toward the cleaning saw cylinder 33.

The brush 24 and beater bars 25 cause trash to be expelled downwardly from the cleaning saw cylinder 23, and there is always a certain amount of cotton that falls with the trash. All of this trash and cotton are guided between the hull board 26 and the baffle wall 27 toward the reclaimer saw cylinder 28. The trash is discharged downwardly toward the screw conveyor 31.

Similarly, the beater bars 34 caused the trash to be discharged downwardly from the cleaning saw cylinder 33 toward the reclaimer saw cylinder 35. This trash, and what cotton drops with it, is guided between the baffle walls 42 and 38 toward the reclaimer saw cylinder 35 which intercepts the cotton while passing the trash downwardly toward the screw conveyor 31.

The faster rotating reclaimer saw cylinder 28 doffs the cotton from the reclaimer saw cylinder 35 and is in turn doffed by the doffer wheel 40. The doffer wheel 40 also operates as a doffer for the cleaning saw cylinder 23. The doffer discharges all of its cotton toward the right onto the teeth of the cleaning saw cylinder 33.

The directions of rotation of the various saw cylinders, especially the two cleaning saw cylinders 23 and 33, are significant, since both these cleaning saw cylinders rotate in counterclockwise directions, and because of their positions relative to the doffer wheel 40, all of the trash discharged from these cleaning saw cylinders 23 and 33 is caused to fall on opposite sides of the doffer wheel 40. Hence there is never a problem of interference or commingling of cleaned cotton with trash or with dirty cotton as such cleaned cotton is conveyed by the doffer wheel 40. Also, if any of the cotton is dropped from the doffer wheel 40, it falls onto the upper surface of the reclaimer saw cylinder 28 and is immediately redoffed by the doffer wheel 40 before it can mix with the dirty cotton or with the trash around the reclaimer saw cylinder 28.

Likewise, the directions of rotation of the reclaimer saw cylinders 28 and 35, and their relative positions, are significant. The reclaimer saw cylinder 35 intercepts cotton dropped from the cleaning saw cylinder 33. This cotton is doffed by the reclaimer saw cylinder 28 and is carried by that saw cylinder until the cotton is doffed by the doffer wheel 40. This last doffing occurs before such cotton can intermix with trash around the reclaimer saw cylinder 28.

From the foregoing, it is evident that all of the paths of cleaned cotton are kept separate from the paths of trash discharge which are on opposite sides of the doffer wheel 40. Nevertheless, the arrangement of reclaimer saw cylinders 28 and 35 is such that the trash is generally collected at the lower end of the machine housing, and all of the trash is carried out of the housing by a single conveyor 31.

One of the advantages of the present invention is that the top of the cleaning saw cylinder 33 turns toward the distributor roller 18 instead of away from it. This enables the present machine to utilize the stream splitting feature of the distributor roller 18 and also permits reclaiming of the cotton from the refuse discharge by both the cleaning saw cylinders 23 and 33 with a common reclaiming mechanism.

It has already been mentioned that considerably more than half of the trash initially introduced into the machine with the field cotton is thrown to the left by the distributor roller 18. Along with this trash, considerably less than half the cotton is thrown to the left onto the teeth of the saw cylinder 23. Hence, the cotton on the saw cylinder 23 is much dirtier than the cotton which is thrown toward the cleaning saw cylinder 33. However, this dirtier cotton, initially cleaned by the saw cylinder 23, is doffed by the doffer wheel 40 and again subjected to cleaning by the cleaning saw cylinder 33. On the other hand, the cleaner cotton thrown directly toward the cleaning saw cylinder 33 by the distributor roller 18 does not require the double cleaning action. This arrangement of the cleaning saw cylinders 23 and 33 and the distributor roller 18 provides maximum cleaning efficiency in a cotton cleaning machine that has relatively few cleaning saw cylinders.

Various changes and modifications may be made within the process of this invention as will be readily apparent to those skilled in the art. Such changes and modifications are within the scope and teaching of this invention as defined by the claims appended hereto.

What is claimed is:

1. A cotton cleaning machine comprising a housing, an inlet to the housing for the introduction of cotton and trash thereinto, a first cleaning saw cylinder adjacent one side of the inlet, a second cleaning saw cylinder adjacent another side of the inlet and spaced laterally from the first cleaning saw cylinder, means for directing some of the cotton and trash toward the first cleaning saw cylinder and the rest toward the second cleaning saw cylinder, means associated with each cleaning saw cylinder for separating trash from the cotton, whereby the lateral spacing of the cleaning saw cylinders causes the trash to fall downwardly from the first and second cleaning saw cylinders in laterally spaced separate paths, and means in the paths of trash to reclaim cotton dropped with the trash, thereby enabling its return to one of the cleaning saw cylinders in a path separate from the trash paths.

2. The cotton cleaning machine of claim 1 wherein the reclaiming means comprises two reclaimer saw cylinders, one for each path of trash, one reclaimer saw cylinder also comprising a doffer for the other, and doffing means adjacent the said one reclaimer saw cylinder.

3. A cotton cleaning machine comprising a housing, an inlet into the housing for the introduction of cotton and trash thereinto, a first cleaning saw cylinder below the inlet, a second cleaning saw cylinder below the inlet and spaced from the first cleaning saw cylinder, means for directing some of the cotton and trash toward the first cleaning saw cylinder and the rest of the cotton and trash toward the second cleaning saw cylinder, means for doffing cotton from the first saw cylinder and directing it to the second saw cylinder, means for separating trash from the cotton on the first and second saw cylinders and for directing the trash in separate paths to the lower ends of the machine, and means for reclaiming cotton dropped with the trash enabling return of the reclaimed cotton to one of the cleaning saw cylinders.

4. The cotton cleaning machine of claim 3 wherein the directing means comprises a distributor roller for directing more than half the trash and less than half the cotton toward the first cleaning saw cylinder.

5. The cotton cleaning machine of claim 4 wherein the distributor roller rotates at a substantially higher rate of speed than the cleaning saw cylinders.

6. The cotton cleaning machine of claim 5 wherein the first cleaning saw cylinder rotates in a direction that moves its upper side away from the directing means and the second cleaning saw cylinder rotates in a direction that moves its upper surface toward the directing means.

7. A cotton cleaning machine comprising a housing, an inlet to the housing for the introduction of cotton and trash thereinto, a first cleaning saw cylinder adjacent one side of the inlet, a second cleaning saw cylinder adjacent another side of the inlet and spaced laterally from the first cleaning saw cylinder, means for directing some of the cotton and trash toward the first cleaning saw cylinder and the rest toward the second cleaning saw cylinder, means associated with each cleaning saw cylinder for separating trash from the cotton whereby the lateral spacing of the cleaning saw cylinders causes the trash to fall downwardly from the first and second cleaning saw cylinders in laterally spaced separate paths, a first reclaimer saw cylinder in one of the paths of trash, a second reclaimer saw cylinder in one of the paths of trash, a second reclaimer saw cylinder in the other path of trash, and a doffer wheel to doff cotton from the first reclaimer saw cylinder and return the doffed cotton to one of the cleaning saw cylinders.

8. The cotton cleaning machine of claim 7 including baffle walls separating the doffer wheel from the paths of trash.

9. The cotton cleaning machine of claim 7 wherein the first reclaimer saw cylinder is positioned for and has a surface speed to doff cotton from the second reclaimer saw cylinder.

10. The cotton cleaning machine of claim 5 wherein the reclaiming means comprises two reclaimer saw cylinders, one also comprising a doffer for the other, and a doffer wheel positioned between the two paths of trash for doffing cotton from the said one reclaimer saw cylinder.

No references cited.

RUSSELL C. MADER, *Primary Examiner.*
DONALD W. PARKER, *Examiner.*